United States Patent [19]

Kamo

[11] Patent Number: 5,646,787

[45] Date of Patent: Jul. 8, 1997

[54] ZOOM LENS SYSTEM

[75] Inventor: Yuji Kamo, Hino, Japan

[73] Assignee: Olympus Optical Co., Ltd., Tokyo, Japan

[21] Appl. No.: 388,605

[22] Filed: Feb. 14, 1995

[30] Foreign Application Priority Data

Feb. 15, 1994 [JP] Japan ................................. 6-039252

[51] Int. Cl.$^6$ ................................................ G02B 15/14
[52] U.S. Cl. ............................................ 359/692; 359/689
[58] Field of Search ................................. 359/689, 692, 359/690

[56] References Cited

U.S. PATENT DOCUMENTS

| | | | |
|---|---|---|---|
| 4,836,660 | 6/1989 | Ito | 359/691 |
| 5,004,329 | 4/1991 | Tsuchida | 359/689 |
| 5,059,006 | 10/1991 | Kikuchi et al. | 359/689 |

FOREIGN PATENT DOCUMENTS

| | | |
|---|---|---|
| 345916 | 2/1991 | Japan . |
| 3127008 | 5/1991 | Japan . |
| 3233422 | 10/1991 | Japan . |
| 6175025 | 6/1994 | Japan . |

*Primary Examiner*—Scott J. Sugarman
*Attorney, Agent, or Firm*—Cushman, Darby & Cushman IP Group of Pillsbury Madison & Sutro LLP

[57] ABSTRACT

A zoom lens system comprising, at an image side location, a lens unit which has a negative refractive power and consists, in order from the object side, of a positive front subunit and a negative rear subunit: the front subunit being composed of a negative lens component consisting of a negative lens element and a positive lens element, the rear subunit being composed only of a single negative lens component, and the negative lens element having an aspherical surface which weakens a negative refractive power as portions of the aspherical surface are farther from an optical axis thereof.

23 Claims, 10 Drawing Sheets

FIG. 5A
SPHERICAL ABERRATION

FIG. 5B
ASTIGMATISM

FIG. 5C
DISTORTION

FIG. 5D
LATERAL CHROMATIC ABERRATION

FIG. 6A
SPHERICAL ABERRATION

FIG. 6B
ASTIGMATISM

FIG. 6C
DISTORTION

FIG. 6D
LATERAL CHROMATIC ABERRATION

FIG. 7A
SPHERICAL ABERRATION

FIG. 7B
ASTIGMATISM

FIG. 7C
DISTORTION

FIG. 7D
LATERAL CHROMATIC ABERRATION

FIG. 8A
SPHERICAL ABERRATION

FIG. 8B
ASTIGMATISM

FIG. 8C
DISTORTION

FIG. 8D
LATERAL CHROMATIC ABERRATION

FIG. 15A SPHERICAL ABERRATION
FIG. 15B ASTIGMATISM
FIG. 15C DISTORTION
FIG. 15D LATERAL CHROMATIC ABERRATION

FIG. 16A SPHERICAL ABERRATION
FIG. 16B ASTIGMATISM
FIG. 16C DISTORTION
FIG. 16D LATERAL CHROMATIC ABERRATION

ZOOM LENS SYSTEM

BACKGROUND OF THE INVENTION

1. Field of the Invention

The present invention relates to a zoom lens system which is to be used with compact cameras and so on, has a short back focal length and uses a negative lens unit disposed on the image side therein.

2. Description of the Prior Art

Lens systems for compact cameras which need not have long back focal lengths, unlike lens system for single-lens reflex cameras, may use nagative lens units disposed on the image side therein for shortening total lengths of the lens systems. For each of the lens systems which use the negative lens units disposed on the image side therein, it is conventional to correct aberrations by composing the negative lens unit of a positive lens element and a negative lens element which have refractive powers contrary to each other.

Since aberrations are varied remarkably by zooming a zoom lens system which has a high vari-focal ratio, it is necessary for such a zoom lens system to correct aberrations more strictly in each of lens units used for composing the zoom lens system.

When chromatic aberration is corrected by strengthening a refractive power of a positive lens element and a refractive power of a negative lens element, it is impossible to correct the other aberrations, astigmatism and coma in particular. As a conventional example which uses a positive lens element and a negative lens element for composing the above-mentioned negative lens unit in addition to an aspherical surface adopted as a surface of the positive lens element for balancing chromatic aberration with the other aberrations, there is known a zoom lens system disclosed by Japanese Patent Kokai Publication No. Hei 3-127,008. The correcting means adopted for this conventional example and the similar zoom lens systems is effective for favorably correcting astigmatism and coma, but since the positive lens element has a weak paraxial refractive power, the zoom lens systems allow longitudinal chromatic aberration to be varied by moving zooming lens units and have chromatic aberration which cannot be said to be sufficiently corrected.

A zoom lens system disclosed by Japanese Patent Kokai Publication No. Hei 3-45,916 is known as a conventional example in which the above-mentioned negative lens unit is composed of a plurality of negative lens elements and a plurality of positive lens elements for correcting chromatic aberration. This zoom lens system is composed of three positive, positive and negative lens units or four positive, negative, positive and negative lens units.

In addition to the conventional examples described above, a zoom lens system disclosed by Japanese Patent Kokai Publication No. Hei 3-233,422 is known as a zoom lens system which comprises an image side negative lens unit using a cemented lens component for correcting chromatic aberration. This zoom lens system is composed of three negative, positive and negative lens units.

Out of the conventional examples mentioned above, the zoom lens system disclosed by Japanese Patent Kokai Publication No. Hei 3-45,916 has a defect that it exhibits a low effect for correcting aberrations other than chromatic aberration due to a fact that a front subunit of such a negative lens unit as the third lens unit out of the three lens units or the fourth lens unit out of the four lens units has a remakably low refractive power when the front subunit is composed of a cemented lens component consisting of a negative lens element and a positive lens element or a positive lens element and a negative lens unit, and a rear subunit of the negative lens unit is composed of a negative lens component.

Further, when a third lens unit is composed of a cemented lens component consisting of a positive lens element, a negative lens element and a positive lens element in a zoom lens system comprising three lens units, like the zoom lens system disclosed by Japanese Patent Kokai Publication No. Hei 3-233,422, the cemented lens component has a strong negative refractive power and produces aberrations, thereby making it necessary to dispose a positive lens component on the object side for cancelling the aberrations and use a large number of lens elements for composing the zoom lens system while enhancing a manufacturing cost thereof.

SUMMARY OF THE INVENTION

A primary object of the present invention is to provide a zoom lens system which is to be used with compact cameras and so on, has a short back focal length, uses a negative lens unit disposed on the image side therein and has favorably corrected aberrations, chromatic aberration in particular.

The zoom lens system according to the present invention is characterized in that it comprises a negative lens unit GN disposed on the image side, that the negative lens unit consists of positive front subunit GF composed of a cemented lens component which consists, in order from the object side, of a negative lens element and a positive lens element, and a rear subunit GR which consists only of a negative lens component, that the zoom lens system uses at least one aspherical surface which weakens a negative refractive power (as portions of the aspherical surface are farther from an optical axis thereof toward a margin thereof) and that the zoom lens system satisfies the following condition (1):

$$-0.6 < f_{GR}/f_{GF} < -0.17 \tag{1}$$

wherein the reference symbol $f_{GF}$ represents a focal length of the front subunit and the reference symbol $f_{GR}$ designates a focal length of the rear subunit.

In a zoom lens system which comprises a negative lens unit GN on the image side, like the zoom lens system according to the present invention, the negative lens unit GN is conventionally consists of a front subunit GF composed of a positive meniscus lens component having a convex surface on the image side and a rear subunit GR composed of a negative meniscus lens component. However, this zoom lens system allows aberrations to be varied by zooming due to a fact that chromatic aberration is not corrected completely in the negative lens unit. For improving optical performance of the zoom lens system, it is therefore necessary to correct chromatic aberration favorably in the negative lens unit GN mentioned above. When an attempt is made to correct chromatic aberration in the negative lens unit GN by disposing a cemented lens component having a remarkably high achromatic effect in the rear subunit of this lens unit, rays will be high on the rear subunit and the cemented lens component must have a large diameter, thereby posing problems related to manufacturing cost and compactness of the zoom lens system.

According to the present invention, a cemented lens component is disposed in the front subunit GF of the above-mentioned negative lens unit GN so that the cemented lens component need not have a large diameter and chromatic aberration can be corrected favorably while preventing a manufacturing cost of the zoom lens system from being enhanced. Further, when the front subunit GF which generally has a meniscus shape is composed of a cemented lens component consisting of a positive lens element and a negative lens element in order from the object side, a cemented surface has a radius of curvature which is larger than a radius of curvature on a surface of incidence of the front subunit. Accordingly, these lens elements must be thick for reserving sufficient thickness for marginal portions thereof, thereby posing a problem related to a manufacturing cost of the zoom lens system. Furthermore, the cemented surface produces aberrations of high orders, thereby degrading optical performance of the zoom lens system. For this reason, the zoom lens system according to the present invention adopts the front subunit which is composed of a cemented lens component consisting of a negative lens element and a positive lens element in order from the object side.

Moreover, since the negative lens unit GN comprises two or more negative lens elements, its marginal portions have stronger refractive powers for diverging rays, thereby making it impossible to properly balance aberrations. For this reason, the zoom lens system according to the present invention uses, on the negative lens element disposed in the negative lens unit GN, an aspherical surface which weakens a negative refractive power so that aberrations are favorably corrected over an entire range from a center to a marginal portion of an image surface. The expression "weakens a negative refractive power" covers a case where a negative refractive power is weakened to zero and then made positive.

A vari-focal function is allocated to a negative lens unit in all lens systems each of which consists of two lens units and in almost all zoom lens systems each of which consists of three lens units. Accordingly, angles of rays incident on the lens unit having the vari-focal function are remarkably varied, whereby variations of aberrations are caused due to a change of a magnification and can hardly be corrected. For balancing aberrations over an entire range from a wide position to a tele position of a zoom lens system, it is therefore necessary to select an adequate refractive power for the front subunit GF. The condition (1) has been adopted for meeting this requisite.

If the uppper limit of −0.17 of the condition (1) is exceeded, the front subunit GF will have a weakened refractive power, whereby the zoom lens system will be incapable of correcting aberrations in the negative lens unit and allow aberrations to be varied by zooming. If the lower limit of −0.6 of the condition (1) is excceded, in contrast, the front subunit will have too strong a refractive power, thereby making it impossible to correct aberrations even by using an aspherical surface.

For the zoom lens system according to the present invention which has the composition described above, it is desirable to dispose a lens unit GP having a positive refractive power on the object side of the negative lens unit GN located on the image side.

Speaking concretely, the zoom lens system according to the present invention comprises, in order from the object side, the lens unit GP having the positive refractive power and the negative lens unit GN disposed on the image side, and is configured so as to change a focal length of the zoom lens system as a whole by varying an airspace reserved between the lens unit GP having the positive refractive power and the negative lens unit GN: the negative lens unit GN being composed of a positive front subunit GF composed of a cemented lens component which consists, in order from the object side, of a negative lens element and a positive lens element, and a rear subunit GR which consists of a negative lens component; and the negative lens unit GN comprising at least one aspherical surface which weakens a negative refractive power as portions of the aspherical surface are farther from the optical axis. The zoom lens system according to the present invention is configured so as to satisfy the above-mentioned condition (1).

By disposing an additional lens unit having a positive refractive power on the object side in the zoom lens system which has the composition described above, it is possible to configure the zoom lens system more compactly and reduce the manufacturing cost thereof since this lens unit is effective for shortening a total length of the zoom lens system at the wide position thereof in particular and reducing diameters of the lens units disposed on the image side thereof owing to its function to converge rays.

It is desirable to compose this lens unit having the positive refractive power of a single positive lens unit GP1 or two positive lens units GP1 and GP2. When the lens unit GP having the positive refractive power is composed of the single lens unit GP1, or when the zoom lens system is composed of the positive lens unit GP1 and the negative lens unit GN, a magnification of the zoom lens system is changed by varying an airspace reserved between the lens unit GP and the lens unit GN. When the lens unit GP having the positive refractive power is composed of the two positive lens units GP1 and GP2, or when the zoom lens system is composed of the positive lens units GP1, GP2 and the negative lens unit GN, a magnification of the zoom lens system is changed by varying airspaces reserved among the lens units GP1, GP2 and GN.

By composing the zoom lens system according to the present invention of the positive lens unit GP1, the positive lens unit GP2, and the negative lens unit GN as described above, it is possible to simplify mechamisms, and obtain advantages from viewpoints of optical performance and a manufacturing cost of the zoom lens system. Further, it is more advantageous for reasons similar to those described above to compose the zoom lens system of the positive lens unit GP1 and the negative lens unit GN.

When a negative lens element LF has too strong a negative refractive power out of the negative lens element LF and a positive lens element LR which are disposed on the object side and the image side in the front subunit of the negative lens unit GN, the positive lens element LR will have a strong refractive power. When the negative lens element LF has too weak a negative refractive power, in contrast, the negative lens unit GN will have a lowered function for correcting chromatic aberration. For this reason, it is desirable to configure the lens element LF so as to satisfy the following condition (2):

$$0.1 < f_{GN}/f_{LF} < 0.9 \qquad (2)$$

wherein the reference symbol $f_{GN}$ represents a focal length of the negative lens unit GN and the reference symbol $f_{LF}$ designates a focal length of the negative lens element LF disposed in the front subunit of the negative lens unit GN.

If the upper limit of 0.9 of the condition (2) is exceeded, the negative lens element LF will have too strong a refractive power, thereby making it impossible to correct aberrations even by using an aspherical surface. If the lower limit of 0.1 of the condition (2) is exceeded, in contrast, the negative lens unit GN will exhibit a lowered effect for correcting chromatic aberration.

Further, since the front subunit GF comprises the negative lens element LF, the positive lens element LR tends to have a strong refractive power, thereby being low in shapability thereof and requiring a high manufacturing cost. Taking the shapability and manufacturing cost of this lens element into consideration, it is desirable to configure the positive lens element LR so as to satisfy the following condition (3):

$$-1.6 < r_R/I_h < -0.7 \quad (3)$$

wherein the reference symbol $r_R$ represents a radius of curvature on an image side surface of the positive lens element LR and the reference symbol $I_h$ designates an image height on this lens element.

If the upper limit of −0.7 of the condition (3) is exceeded, the positive lens element LR must be thickened for reserving required thickness for a marginal portion thereof, thereby requiring a high manufacturing cost and a radius of curvature on this lens element will be small for heights of rays on this lens element, thereby making it hardly shapable in practice. If the lower limit of −1.6 of the condition (3) is exceeded, the positive lens element LR will have a weakened positive refractive power, thereby degrading optical performance of the zoom lens system.

In addition, it is possible to configure the lens element LF so as to be thinner and make this lens element of a synthetic resin material for further reducing the manufacturing cost of the zoom lens system.

By selecting a composition wherein a negative lens unit is disposed on the image side such as that of the zoom lens system according to the present invention and disposing an additional lens unit having a positive refractive power on the object side, it is possible to configure a zoom lens system compacter and reduce a manufacturing cost thereof since the lens unit having the positive refractive power is effective for shortening a total length of a zoom lens system and reducing diameters of lens units disposed on the image side thereof.

DETAILED DESCRIPTION OF THE PREFERRED EMBODIMENTS

Now, the zoom lens system according to the present invention will be described in more detail below with reference to the preferred embodiments illustrated in the accompanying drawings and given in a form of the numerical data listed below:

Embodiment 1

$f = 39.2 \sim 63.1 \sim 101.7$,   F number $= 4.66 \sim 6.40 \sim 8.80$
$2\omega = 56.5° \sim 37.9° \sim 24.1°$, $f_B = 8.97 \sim 33.25 \sim 72.47$
$r_1 = 15.6407$
  $d_1 = 2.300$      $n_1 = 1.51633$      $v_1 = 64.15$
$r_2 = 31.5907$
  $d_2 = 1.982$
$r_3 = -15.5977$
  $d_3 = 1.400$      $n_2 = 1.79952$      $v_2 = 42.24$
$r_4 = 66.4091$
  $d_4 = 0.913$
$r_5 = -130.1853$
  $d_5 = 3.576$      $n_3 = 1.51633$      $v_3 = 64.15$
$r_6 = -13.7137$
  $d_6 = 0.150$
$r_7 = 29.3015$
  $d_7 = 3.000$      $n_4 = 1.56873$      $v_4 = 63.16$
$r_8 = -34.7740$ (aspherical surface)
  $d_8 = 0.800$
$r_9 = \infty$ (stop)
  $d_9 = D_1$
$r_{10} = -100.0772$ (aspherical surface)
  $d_{10} = 1.500$   $n_5 = 1.80440$      $v_5 = 39.58$
$r_{11} = 50.0317$
  $d_{11} = 3.232$   $n_6 = 1.60342$      $v_6 = 38.01$
$r_{12} = -26.9662$ (aspherical surface)
  $d_{12} = 3.709$
$r_{13} = -10.9183$
  $d_{13} = 1.500$   $n_7 = 1.69680$      $v_7 = 55.52$
$r_{14} = -39.1314$
  aspherical surface coefficient
(8th surface)
$P = 1.0000$,   $E = 0.10539 \times 10^{-4}$, $F = 0.13321 \times 10^{-6}$
              $G = -0.34940 \times 10^{-8}$, $H = 0.36384 \times 10^{-10}$
(10th surface)
$P = -4.1349$,  $E = 0.42013 \times 10^{-4}$, $F = 0.62825 \times 10^{-6}$
              $G = -0.77156 \times 10^{-8}$, $H = 0.12551 \times 10^{-9}$
              $I = -0.58640 \times 10^{-12}$
(12th surface)
$P = 1.0000$,   $E = 0.15851 \times 10^{-5}$, $F = 0.48733 \times 10^{-6}$
              $G = -0.50359 \times 10^{-8}$, $H = 0.55200 \times 10^{-10}$
              $I = 0.40712 \times 10^{-13}$
  f      39.2     63.1     101.7

Embodiment 1

| | | | |
|---|---|---|---|
| $D_1$ | 16.1121 | 7.7172 | 2.5000 |

$f_{GR}/f_{GF} = -0.244$, $f_{GN}/f_{LF} = 0.718$, $r_R/I_h = -1.247$

---

Embodiment 2

$f = 39.3 \sim 63.1 \sim 101.3$,  F number = $4.66 \sim 6.55 \sim 9.21$
$2\omega = 56.5° \sim 37.7° \sim 24.0°$, $f_B = 8.33 \sim 31.68 \sim 69.39$
$r_1 = 19.9651$ (aspherical surface)
  $d_1 = 2.000$    $n_1 = 1.49241$    $v_1 = 57.66$
$r_2 = 13.7522$
  $d_2 = 5.639$
$r_3 = 68.1636$
  $d_3 = 1.500$    $n_2 = 1.80518$    $v_2 = 25.43$
$r_4 = 29.1814$
  $d_4 = 8.640$    $n_3 = 1.56873$    $v_3 = 63.16$
$r_5 = -15.2156$
  $d_5 = 1.000$
$r_6 = \infty$ (stop)
  $d_6 = D_1$
$r_7 = -36.5042$ (aspherical surface)
  $d_7 = 0.100$    $n_4 = 1.52540$    $v_4 = 51.81$
$r_8 = -88.4470$
  $d_8 = 3.200$    $n_5 = 1.59551$    $v_5 = 39.21$
$r_9 = -24.2822$
  $d_9 = 5.139$
$r_{10} = -11.5910$
  $d_{10} = 1.500$    $n_6 = 1.72916$    $v_6 = 54.68$
$r_{11} = -42.5958$
aspherical surface coefficient
(1st surface)
$P = 0.8564$,   $E = -0.65896 \times 10^{-4}$, $F = -0.40766 \times 10^{-6}$
       $G = -0.28637 \times 10^{-8}$, $H = -0.46728 \times 10^{-11}$
       $I = 0.31597 \times 10^{-12}$
(7th surface)
$P = 4.3297$,    $E = 0.57785 \times 10^{-4}$, $F = 0.51396 \times 10^{-6}$
       $G = 0.40435 \times 10^{-9}$, $H = 0.20221 \times 10^{-10}$
       $I = -0.14738 \times 10^{-12}$

| f | 39.3 | 63.1 | 101.3 |
|---|---|---|---|
| $D_1$ | 16.5148 | 8.0084 | 2.7000 |

$f_{GR}/f_{GF} = -0.225$, $f_{GN}/f_{LF} = 0.249$, $r_R/I_h = -1.122$

---

Embodiment 3

$f = 39.1 \sim 63.1 \sim 101.3$,  F number = $4.66 \sim 6.55 \sim 9.21$
$2\omega = 56.2° \sim 37.3° \sim 24.00°$, $f_B = 7.80 \sim 29.89 \sim 65.40$
$r_1 = 27.2160$ (aspherical surface)
  $d_1 = 2.000$    $n_1 = 1.49271$    $v_1 = 57.66$
$r_2 = 26.6873$
  $d_2 = 3.723$
$r_3 = 591.4598$
  $d_3 = 1.500$    $n_2 = 1.80518$    $v_2 = 25.43$
$r_4 = 30.0723$
  $d_4 = 8.542$    $n_3 = 1.61484$    $v_3 = 51.17$
$r_5 = -16.2005$
  $d_5 = 1.000$
$r_6 = \infty$ (stop)
  $d_6 = D_1$
$r_7 = -39.2669$ (aspherical surface)
  $d_7 = 0.100$    $n_4 = 1.52540$    $v_4 = 51.81$
$r_8 = -90.5659$
  $d_8 = 3.200$    $n_5 = 1.58144$    $v_5 = 40.75$
$r_9 = -24.1773$
  $d_9 = 4.635$
$r_{10} = -11.0715$
  $d_{10} = 1.500$    $n_6 = 1.72916$    $v_6 = 54.68$
$r_{11} = -41.6818$
aspherical surface coefficient
(1st surface)
$P = 1.9793$,   $E = -0.77289 \times 10^{-4}$, $F = -0.51750 \times 10^{-6}$
       $G = -0.18953 \times 10^{-8}$, $H = 0.60620 \times 10^{-10}$
       $I = -0.92184 \times 10^{-12}$
(7th surface)
$P = 3.3590$,   $E = 0.61437 \times 10^{-4}$, $F = 0.42736 \times 10^{-6}$
       $G = -0.38212 \times 10^{-8}$, $H = 0.97732 \times 10^{-10}$
       $I = -0.57392 \times 10^{-12}$

| f | 39.3 | 63.1 | 101.3 |
|---|---|---|---|
| $D_1$ | 15.8037 | 7.7314 | 2.7000 |

$f_{GR}/f_{GF} = -0.227$, $f_{GN}/f_{LF} = 0.212$, $r_R/I_h = -1.118$

---

Embodiment 4

$f = 39.0 \sim 63.1 \sim 102.0$, F number = $4.26 \sim 6.22 \sim 8.80$
$2\omega = 56.6° \sim 37.1° \sim 23.7°$, $f_B = 9.00 \sim 27.31 \sim 55.11$
$r_1 = 98.2298$
  $d_1 = 1.500$    $n_1 = 1.80518$    $v_1 = 25.43$
$r_2 = 53.2737$
  $d_2 = 0.150$
$r_3 = 36.7460$
  $d_3 = 3.000$    $n_2 = 1.69680$    $v_2 = 56.49$
$r_4 = 170.0233$
  $d_4 = D_1$
$r_5 = -20.8175$ (aspherical surface)
  $d_5 = 2.000$    $n_3 = 1.84666$    $v_3 = 23.78$
$r_6 = -11.9217$
  $d_6 = 1.324$    $n_4 = 1.80440$    $v_4 = 39.58$
$r_7 = -69.0696$
  $d_7 = 0.700$
$r_8 = \infty$ (stop)
  $d_8 = 3.207$
$r_9 = 23.4680$
  $d_9 = 3.000$    $n_5 = 1.80518$    $v_5 = 25.43$
$r_{10} = 12.6265$
  $d_{10} = 5.650$    $n_6 = 1.61700$    $v_6 = 62.79$
$r_{11} = -22.0127$ (aspherical surface)
  $d_{11} = D_2$
$r_{12} = -41.8686$
  $d_{12} = 1.500$    $n_7 = 1.60311$    $v_7 = 60.70$
$r_{13} = -71.9030$
  $d_{13} = 3.500$    $n_8 = 1.59270$    $v_8 = 35.29$
$r_{14} = -19.9669$
  $d_{14} = 3.983$
$r_{15} = -14.4128$ (aspherical surface)
  $d_{15} = 1.500$    $n_9 = 1.72916$    $v_9 = 54.68$
$r_{16} = 541.6962$
aspherical surface coefficient
(5th surface)
$P = 1.0000$,   $E = -0.39242 \times 10^{-5}$, $F = -0.87733 \times 10^{-7}$
       $G = 0.14937 \times 10^{-9}$, $H = -0.17000 \times 10^{-10}$
(11th surface)
$P = 1.0000$,   $E = 0.29727 \times 10^{-4}$, $F = -0.10938 \times 10^{-6}$
       $G = 0.27302 \times 10^{-8}$, $H = -0.31071 \times 10^{-10}$
(15th surface)
$P = 0.6563$,   $E = 0.14060 \times 10^{-4}$, $F = -0.18530 \times 10^{-7}$
       $G = -0.61387 \times 10^{-10}$, $H = -0.38130 \times 10^{-12}$

| f | 39.0 | 63.1 | 102.0 |
|---|---|---|---|
| $D_1$ | 4.2210 | 16.1911 | 25.9893 |
| $D_2$ | 14.9943 | 7.0434 | 1.3371 |

$f_{GR}/f_{GF} = -0.322$, $f_{GN}/f_{LF} = 0.173$, $r_R/I_h = -0.923$

--- wherein the reference symbols $r_1, r_2, \ldots$ represent radii of curvature on respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, the reference symbols $v_1, v_2, \ldots$ represent Abbe's numbers of the respective lens elements, and the reference symbol $f_B$ designates a back focal length of the zoom lens system as a whole.

Figure 1A:
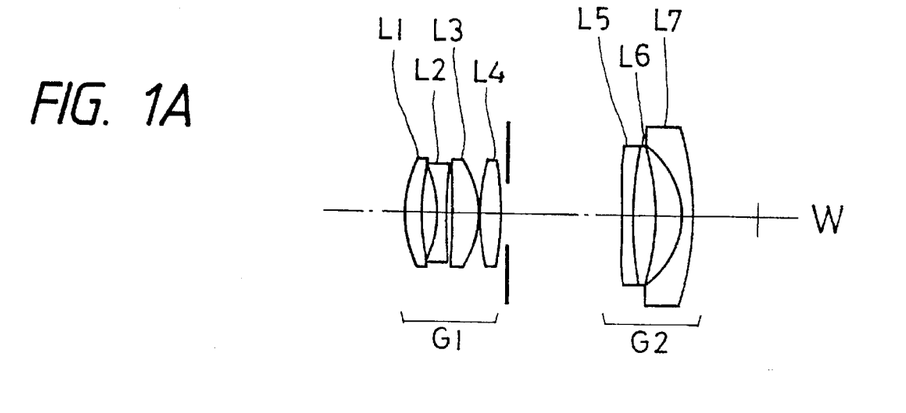
FIG. 1A, FIG. 1B and FIG. 1C show sectional views illustrating a composition of a first embodiment of the zoom lens system according to the present invention.
Figure 1B:
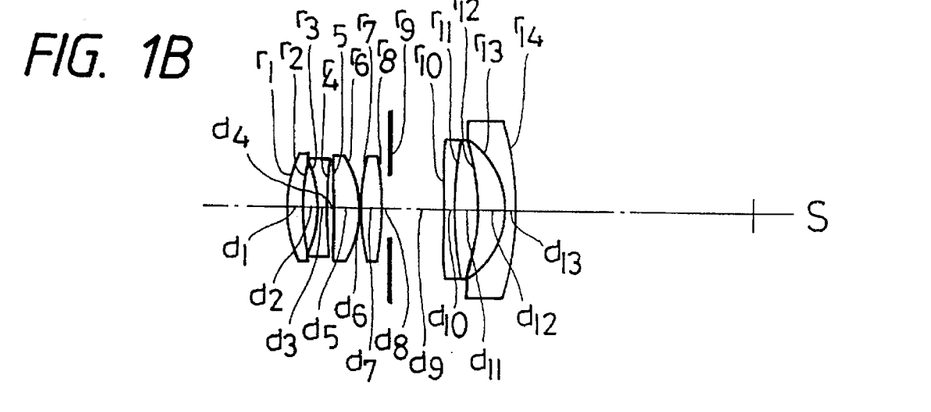
Figure 1C:
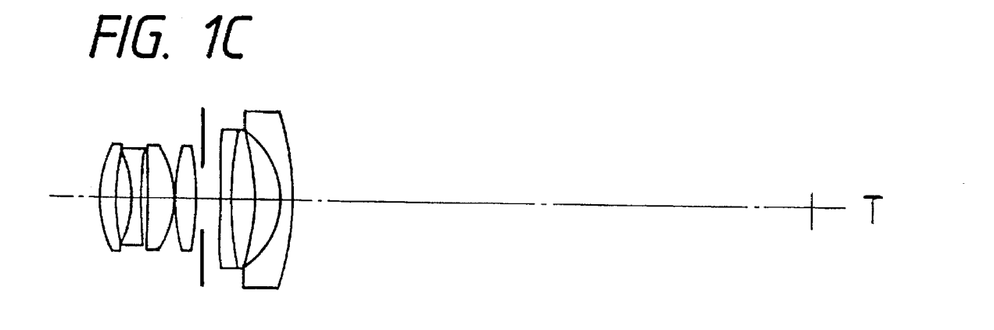

The first embodiment of the present invention has a composition illustrated in FIG. 1A, FIG. 1B and FIG. 1C, wherein the zoom lens system consists of a first positive lens unit $G_1$ and a second negative lens unit $G_2$, and is configured so as to be zoomed from a wide position (W) to a tele position by moving the first lens unit $G_1$ and the second lnes unit $G_2$ toward the object side while narrowing an airspace reserved therebetween. The reference symbol S used in FIG. 1B represents a position of the zoom lens system at which it is set at an intermediate focal length.

The first lens unit $G_1$ comprises, in order from the object side, a positive lens component $L_1$ having a convex surface on the object side, a biconcave lens component $L_2$, a positive lens component $L_3$ having a convex surface on the image side and a biconvex lens component $L_4$ having an aspherical surface on the image side, whereas the second lens unit $G_2$ comprises, in order from the object side, a biconcave lens element $L_5$ having an aspherical surface on the object side which weakens a negative refractive power as portions of the aspherical surface are farther from an optical axis thereof toward the margin thereof, a positive biconvex lens element $L_6$ having an aspherical surface on the image side which weakens a positive refractive power as portions of the aspherical surface are farther from the optical axis toward a margin thereof and a negative lens component $L_7$ having a convex surface on the image side: the lens element $L_5$ and the lens element $L_6$ being cemented to each other.

In the first embodiment, the second lens unit $G_2$ is used as the lens unit GN which is disposed on the most image side and has the negative refractive power, and the front subunit GF of this negative lens unit is composed of a cemented lens component consisting of the negative lens element $L_5$ and the positive lens element $L_6$, whereas the rear subunit GR of the lens unit is composed of the lens component $L_7$. In other words, the lens element $L_5$ and the lens element $L_6$ correspond to the negative lens component LF and the positive lens component LR disposed in the front subunit GF.

By using the aspherical surfaces on the cemented lens component consisting of the lens elements $L_5$ and $L_6$, the zoom lens system preferred as the first embodiment of the present invention suppresses the variation of astigmatism which is apt to be caused in a zoom lens system composed of two lens units and corrects chromatic aberration with good balance over an entire range from a center to a margin of an image surface.

Figure 2A:
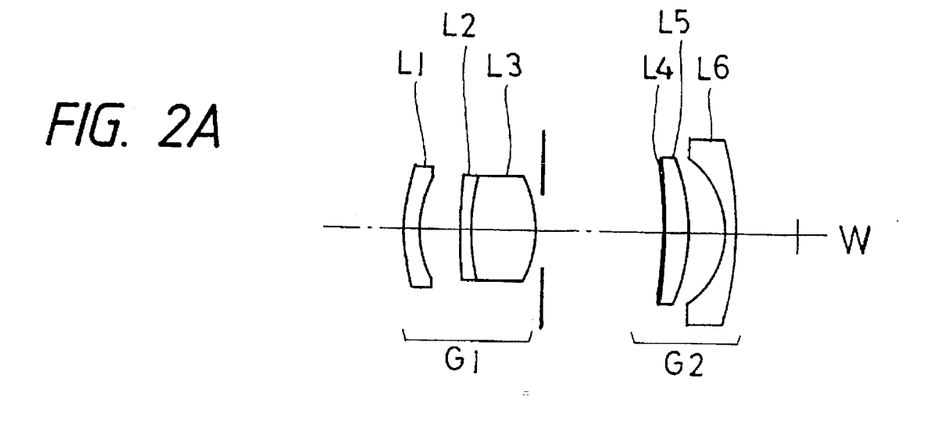
FIG. 2A, FIG. 2B and FIG. 2C show sectional views illustrating a composition of a second embodiment of the zoom lens system according to the present invention.
Figure 2B:
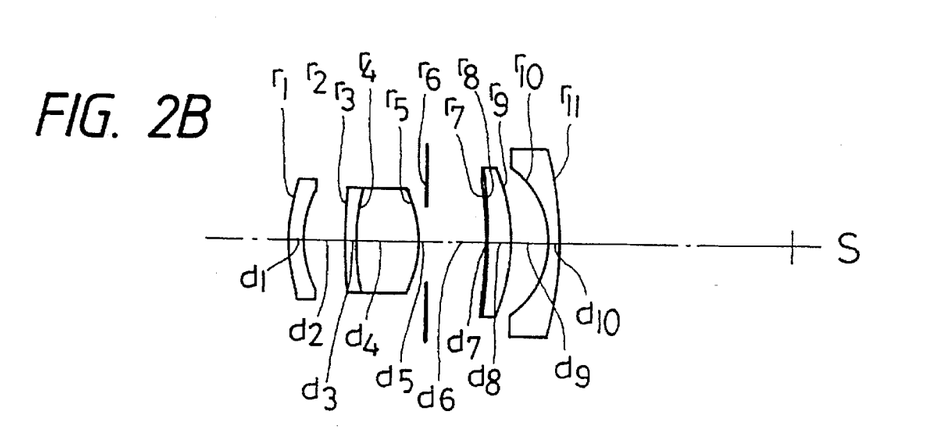
Figure 2C:
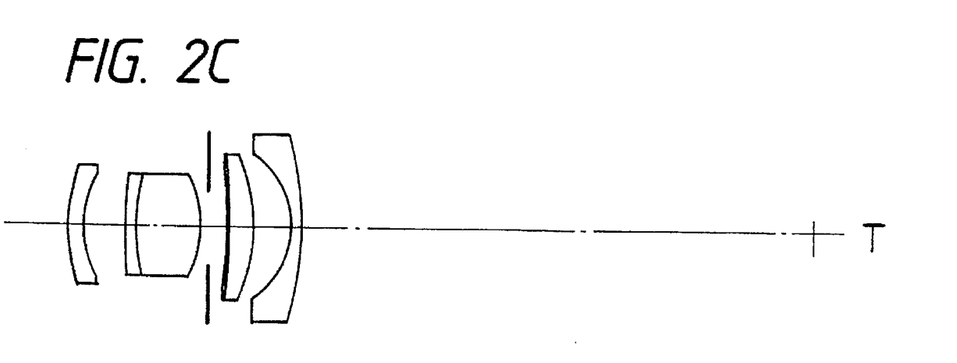

The second embodiment has a composition illustrated in FIG. 2A, FIG. 2B and FIG. 2C, wherein the zoom lens system according to the present invention consists of a first positive lens unit $G_1$ and a second negative lens unit $G_2$, and is configured so as to be zoomed from a wide position (W) to a tele position (T) by moving the first lens unit $G_1$ and the second lens unit $G_2$ while narrowing an airspace reserved therebetween.

The first lens unit $G_1$ comprises, in order from the object side, a negative lens component $L_1$ having an aspherical surface on the object side, a negative lens element $L_2$ having a convex surface on the object side and a biconvex lens element $L_3$: the lens element $L_2$ and the lens element $L_3$ being cemented to each other. Further, the second lens unit $G_2$ comprises, in order from the object side, a negative lens element $L_4$ having an aspherical surface on the object side which weakens a negative refractive power as portions of the aspherical surface are farther from an optical axis thereof toward a margin thereof and a convex surface on the image side, a positive lens element $L_5$ having a convex surface on the image side, and a negative lens component $L_6$ having a convex surface on the image side: the lens element $L_4$ and the lens element $L_5$ being cemented to each other.

The second embodiment is also a zoom lens system wherein the second lens unut $G_2$ is used as the lens unit GN which is disposed on the most image side and has the negative refractive power. The front subunit GF of this negative lens unit is composed of a cemented lens component consisting of the lens elements $L_4$ and $L_5$, whereas the rear subunit GR is composed of the lens component $L_6$. In other words, the negative lens element $L_4$ corresponds to the lens component LF and the positive lens element $L_5$ corresponds to the lens component LR.

In the second embodiment, the negative lens element $L_4$ is configured thin and made of a synthetic resin material for further reducing the manufacturing cost of the zoom lens system according to the present invention.

Figure 3A:
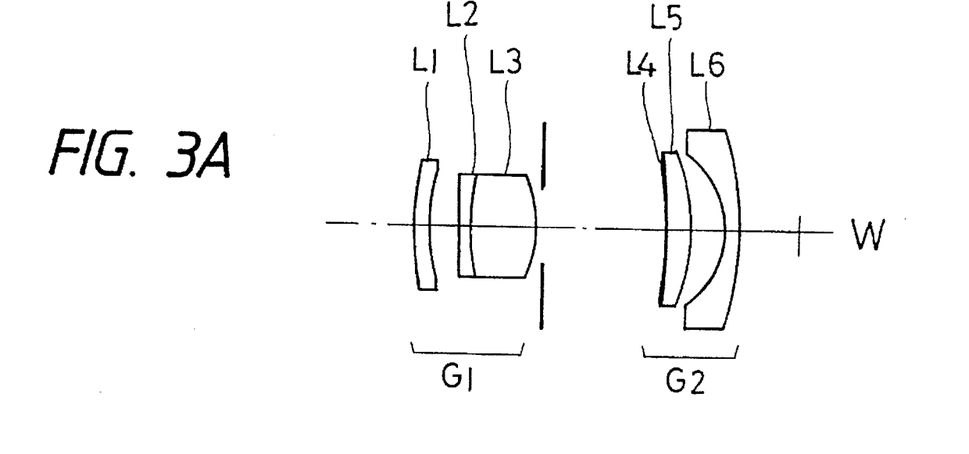
FIG. 3A, FIG. 3B and FIG. 3C show sectional views illustrating a composition of a third embodiment of the zoom lens system according to the present invention.
Figure 3B:
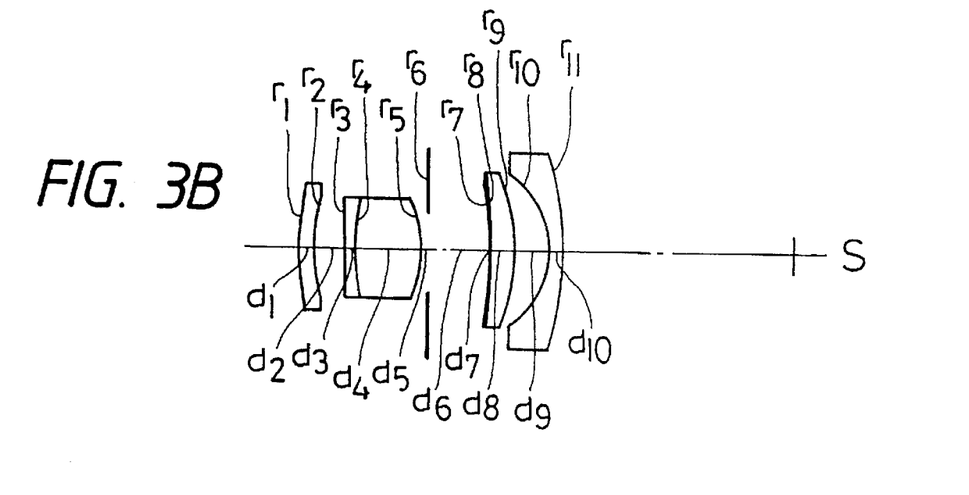
Figure 3C:
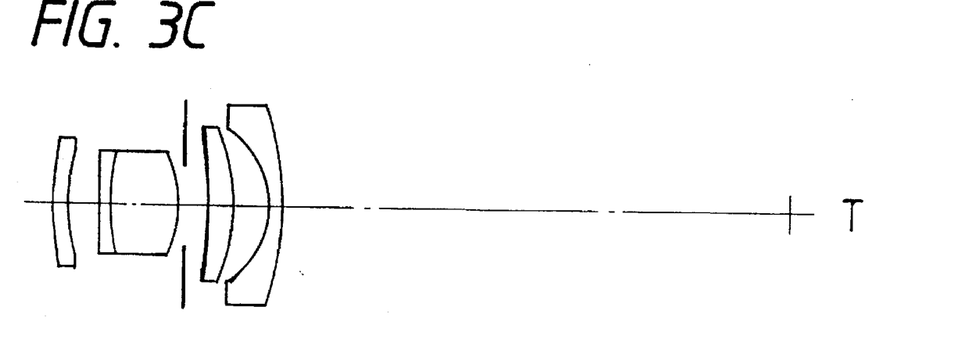

The third embodiment has a composition illustrated in FIG. 3A, FIG. 3B and FIG. 3C, wherein the zoom lens system according to the present invention consists of a first positive lens unit $G_1$ and a second negative lens unit $G_2$, and is configured so as to be zoomed from a wide position (W) to a tele position (T) by moving the first lens unit $G_1$ and the second lens unit $G_2$ toward the object side while narrowing an airspace reserved therebetween.

The first lens unit $G_1$ comprises, in order from the object side, a lens component $L_1$ which has a convex aspherical surface on the object side and a remarkably weak refractive power, a negative lens element $L_2$ having a convex surface on the object side and a biconvex lens element $L_3$: the lens element $L_2$ and the lens element $L_3$ being cemented to each other. Further, the second lens unit $G_2$ comprises, in order from the object side, a negative lens element $L_4$ having an aspherical surface on the object side which weakens a negative refractive power as portions of the aspherical surface are farther from an optical axis thereof toward a margin thereof and a convex surface on the image side, a positive lens element $L_5$ and a negative lens component $L_6$ having a convex surface on the image side: the lens element $L_4$ and the lens element $L_5$ being cemented to each other.

In the third embodiment also, the second lens unit $G_2$ is used as the lens unit GN which is disposed on the most image side and has the negative refractive power, and the front subunit GF of this negative lens unit is composed of a cemented lens component consisting of the lens element $L_4$ and the lens element $L_5$, whereas the rear subunit GR of the lens unit is composed of the lens component $L_6$. In other words, the lens element $L_4$ corresponds to the negative lens component LF disposed in the front subunit GF and the lens element $L_5$ corresponds to the positive lens component LR disposed in the front subunit GF.

The negative lens element $L_4$ is configured thin and made of a synthetic resin material, as in the second embodiment, for further reducing the manufactureing cost of the zoom lens system according to the present invention.

Figure 4A:
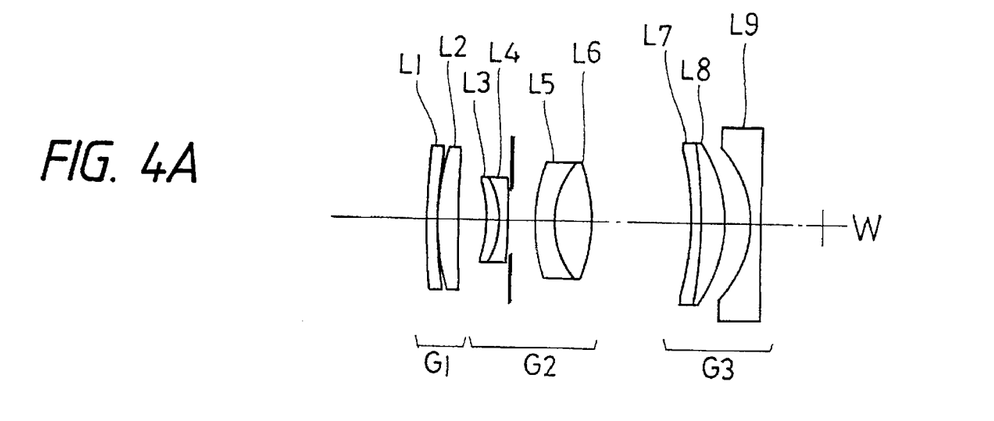
FIG. 4A, FIG. 4B and FIG. 4C show sectional views illustrating a composition of a fourth embodiment of the zoom lens system according to the present invention.
Figure 4B:
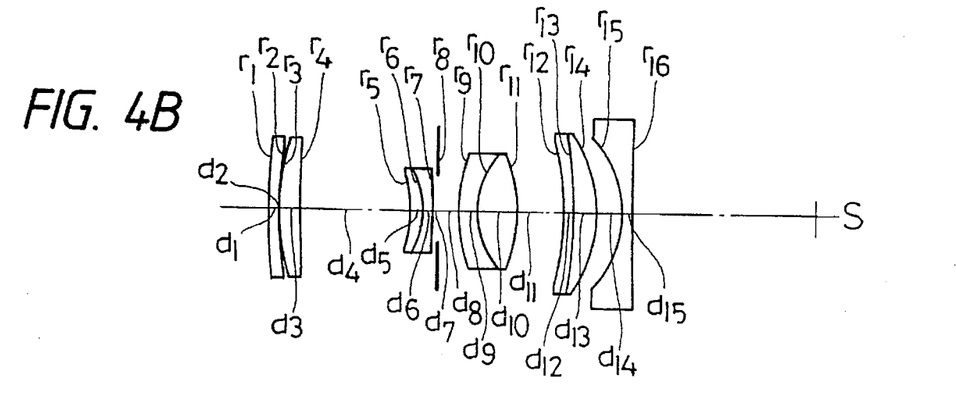
Figure 4C:
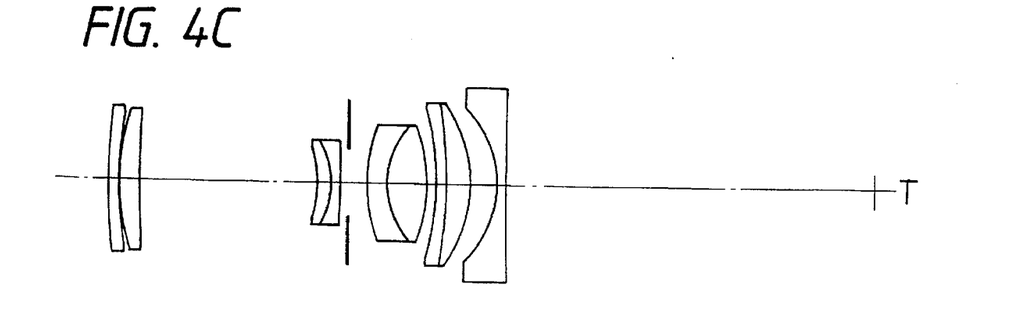
Figure 5A:
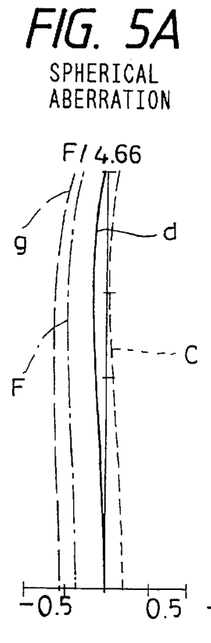
FIG. 5A, FIG. 5B, FIG. 5C and FIG. 5D show graphs illustrating aberration characteristics at a wide position of the first embodiment of the present invention.
Figures 5B, 5C:
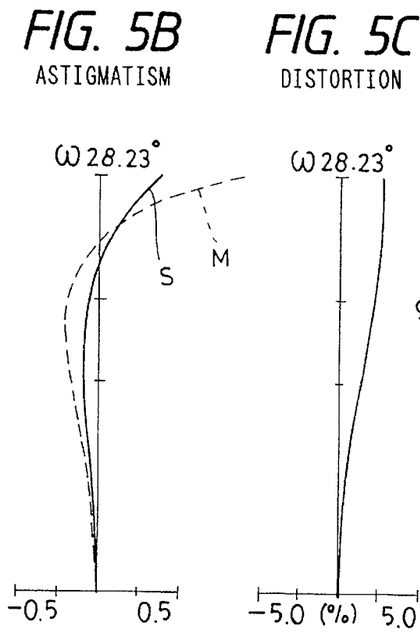
Figure 5D:
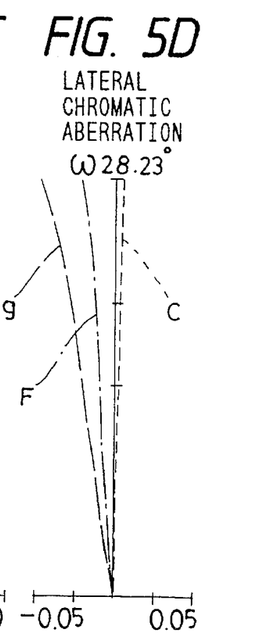
Figure 6A:
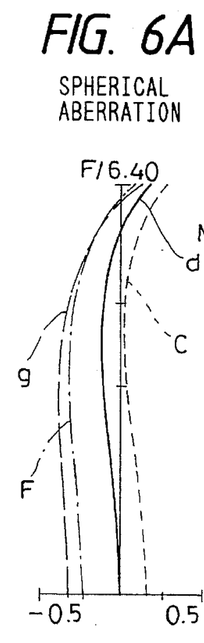
FIG. 6A, FIG. 6B, FIG. 6C and FIG. 6D show graphs illustraing aberration characteristics at an intermediate focal length of the first embodiment of the present invention.
Figures 6B, 6C:
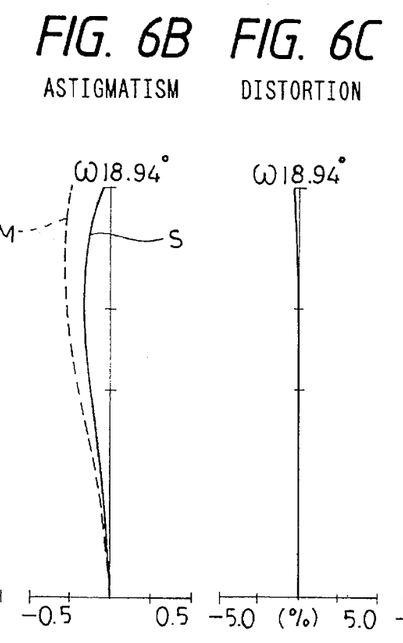
Figure 6D:
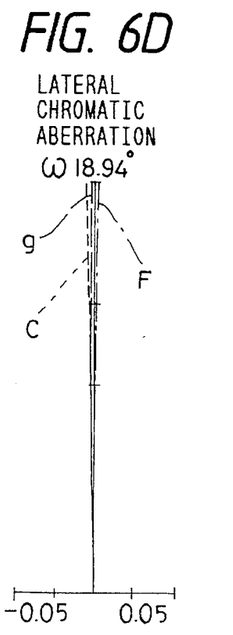
Figures 7A, 7B:
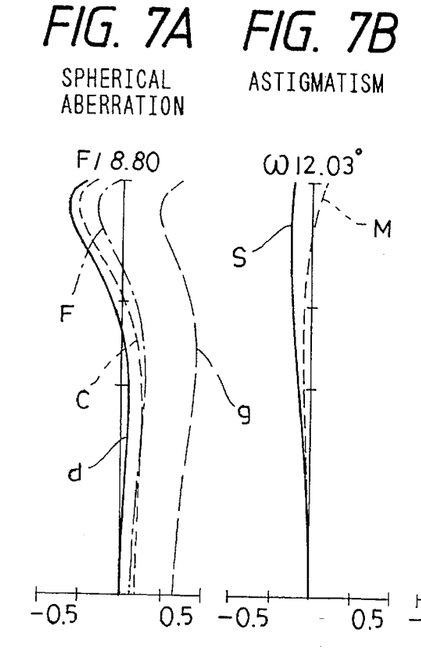
FIG. 7A, FIG. 7B, FIG. 7C and FIG. 7D show graphs illustrating aberration characteristics at a teleposition of the first embodiment of the present invention.
Figure 7C:
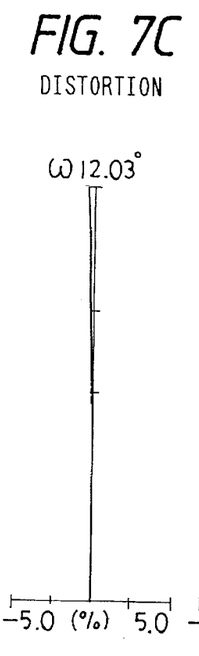
Figure 7D:
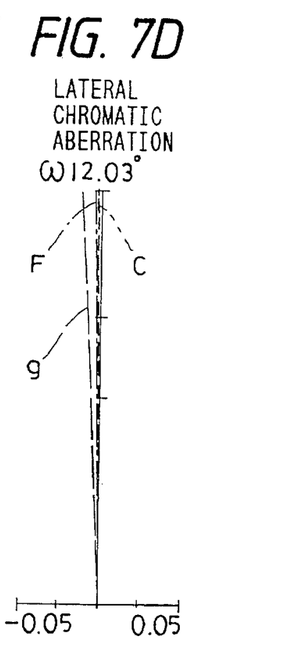
Figures 8A, 8B:
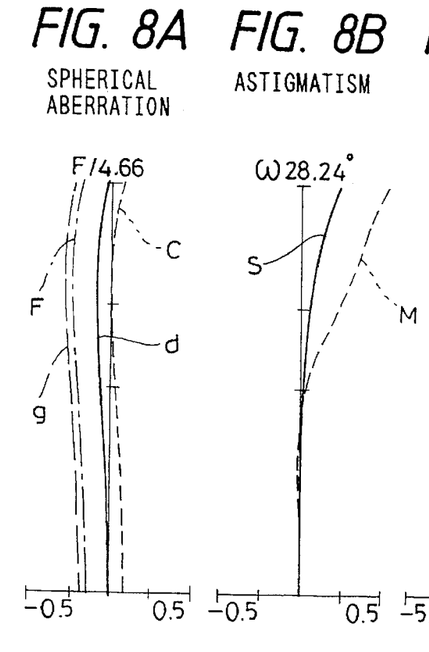
FIG. 8A, FIG. 8B, FIG. 8C and FIG. 8D show curves visualizing aberration characteristics at the wide position of the second embodiment of the present invention.
Figures 8C, 8D:
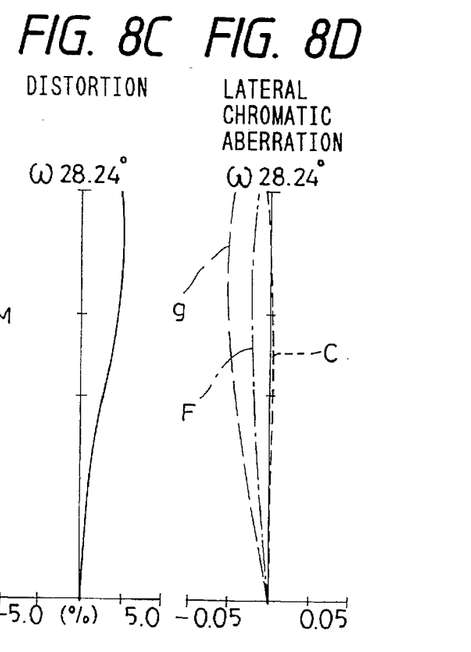
Figure 9A:
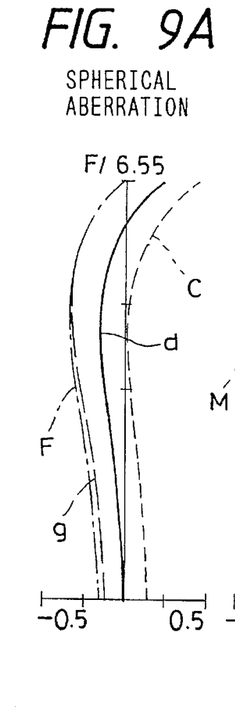
FIG. 9A, FIG. 9B, FIG. 9C and FIG. 9D show curves visualizing aberration characteristics at the intermediate focal length of the second emdodiment of the present invention.
Figure 9B:
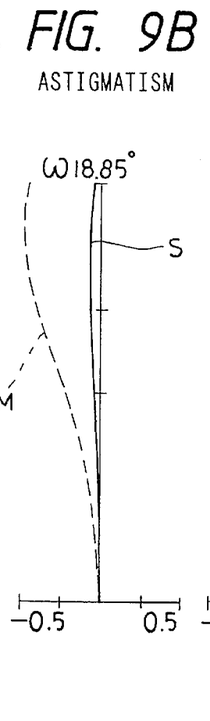
Figures 9C, 9D:
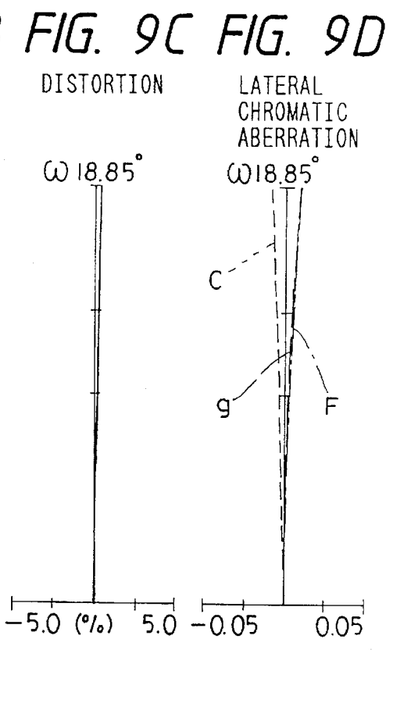
Figures 10A, 10B:
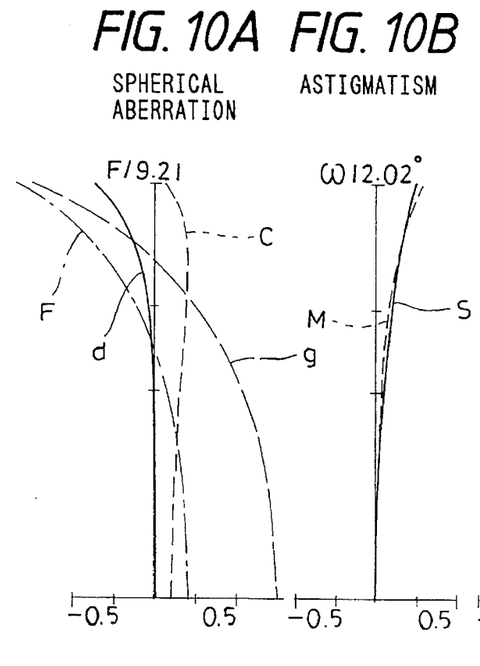
FIG. 10A, FIG. 10B, FIG. 10C and FIG. 10D show curves visualizing aberration chracteristics at the tele position of the second embodiment of the present invention.
Figure 10C:
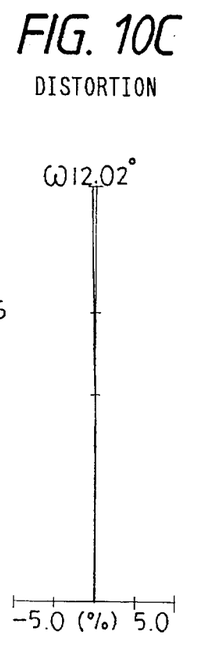
Figure 10D:
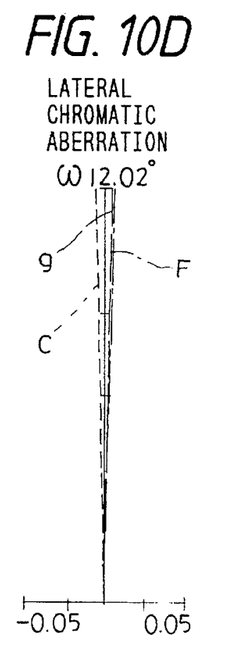
Figure 11A:
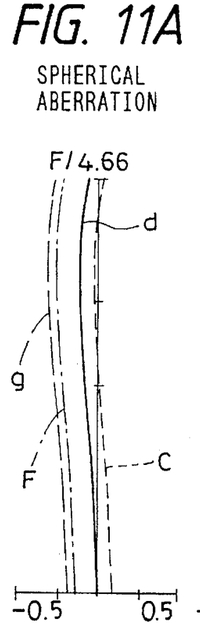
FIG. 11A, FIG. 11B, FIG. 11C and FIG. 11D show curves visualizing aberration characteristics at the wide position of the third embodiment of the present invention.
Figure 11B:
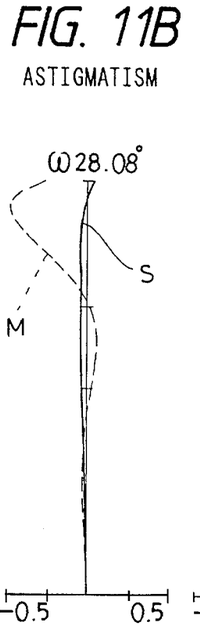
Figures 11C, 11D:
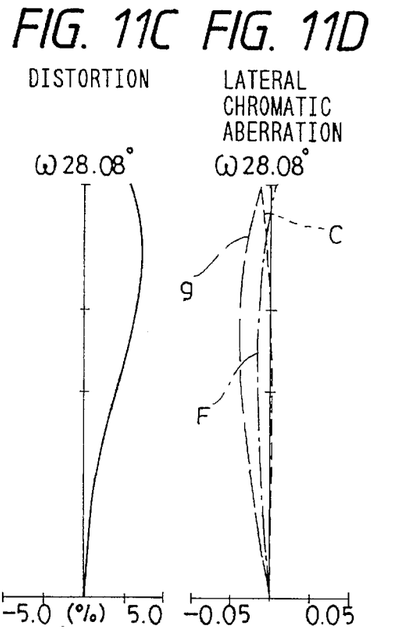
Figure 12A:
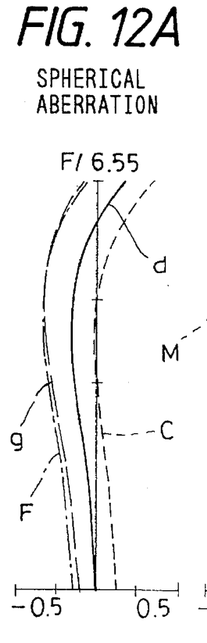
FIG. 12A, FIG. 12B, FIG. 12C and FIG. 12D show graphs illustraing aberration characteristics at the intermediate focal length of the third embodiment of the present invention.
Figure 12B:
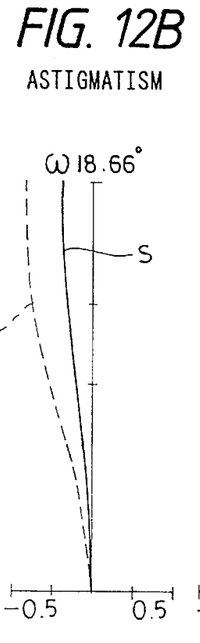
Figure 12C:
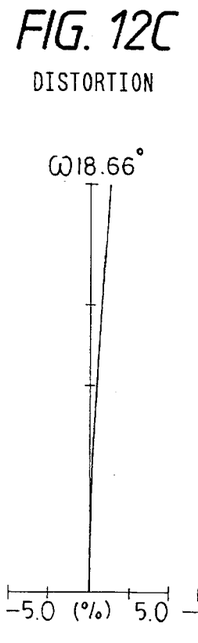
Figure 12D:
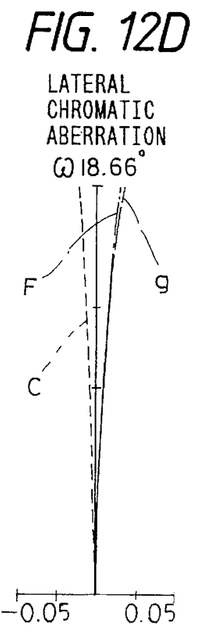
Figure 13A:
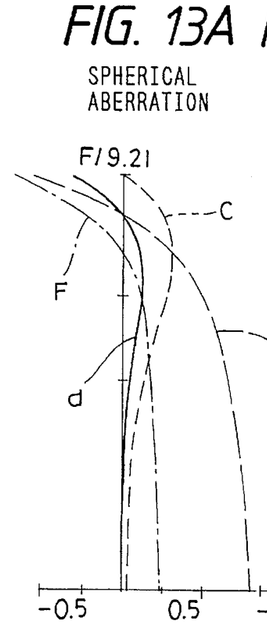
FIG. 13A, FIG. 13B, FIG. 13C and FIG. 13D show graphs illustrating aberration characteristics at the tele position of the third embodiment of the present invention.
Figure 13B:
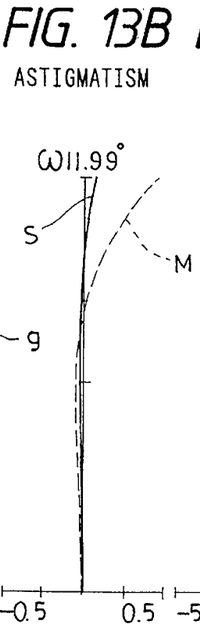
Figure 13C:
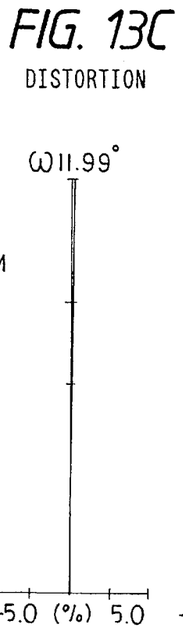
Figure 13D:
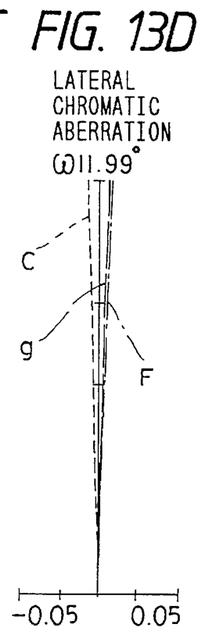
Figure 14A:
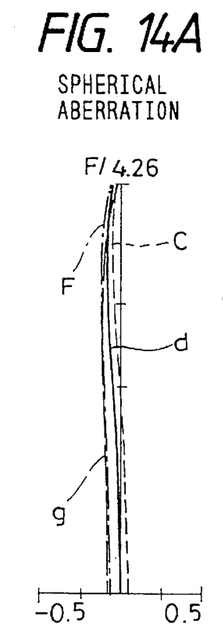
FIG. 14A, FIG. 14B, FIG. 14C and FIG. 14D show graphs illustrating aberration characteristics at the wide position of the fourth embodiment of the present invention.
Figure 14B:
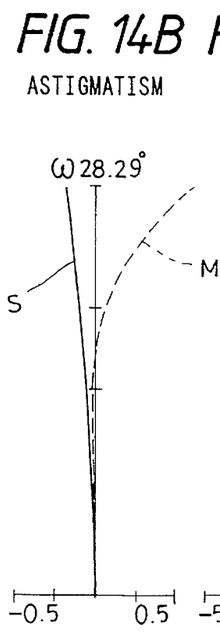
Figure 14C:
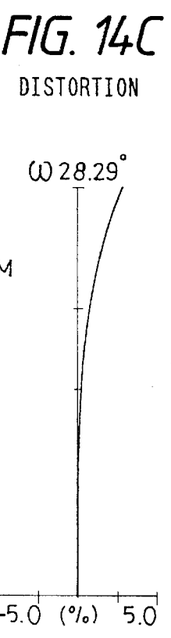
Figure 14D:
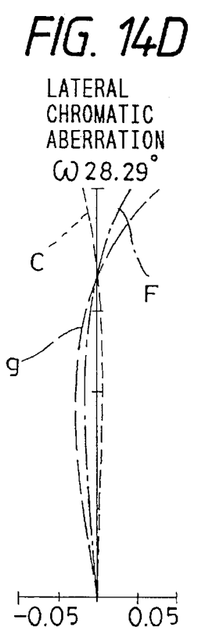
Figure 15A:
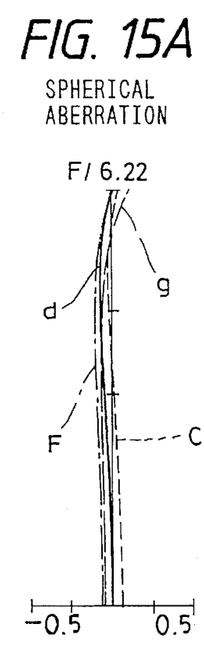
FIG. 15A, FIG. 15B, FIG. 15C and FIG. 15D show graphs illustrating aberration chracteristics at the intermediate focal length of the fourth embodiment of the present invention.
Figure 15B:
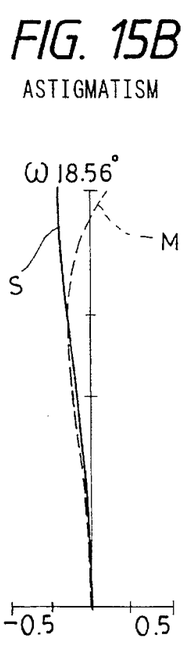
Figure 15C:
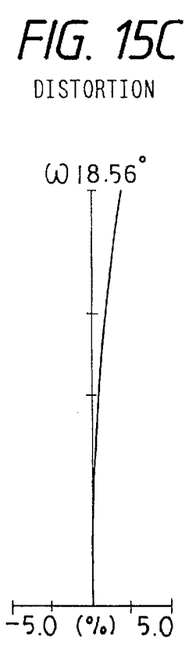
Figure 15D:
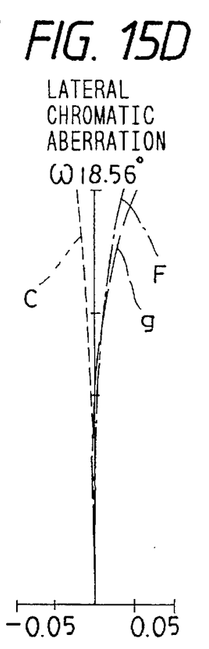
Figures 16A, 16B:
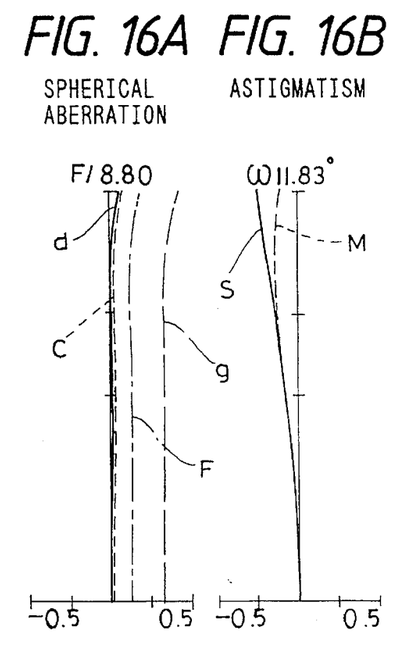
FIG. 16A, FIG. 16B, FIG. 16C and FIG. 16D show curves visualizing aberration characteristics at the tele position of the fourth embodiment of the present invention.
Figure 16C:
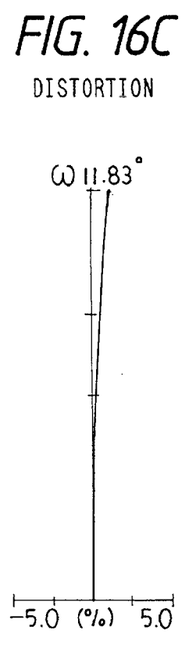
Figure 16D:
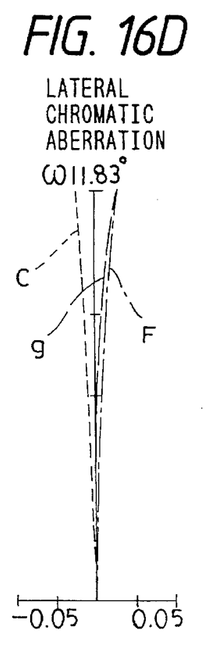

The fourth embodiment has a composition illustrated in FIG. 4A, FIG. 4B and FIG. 4C, wherein the zoom lens system according to the present invention consists of a first positive lens unit $G_1$, a second positive lens unit $G_2$ and a third negative lens unit $G_3$, and is configured so as to be zoomed from a wide position (W) to a tele position (T) by moving these lens units while widening an airspace reserved between the first lens unit $G_1$ and the second lens unit $G_2$, and narrowing an airspace reserved between the second lens unit $G_2$ and the third lens unit $G_3$.

The first lens unit $G_1$ comprises, in order from the object side, a negative lens component $L_1$ having a convex surface on the object side and a positive lens component $L_2$ having a convex surface on the object side, whereas the second lens unit $G_2$ comprises, in order from the object side, a positive lens element $L_3$ having an aspherical surface on the object side and a convex surface on the image side, a negative lens element $L_4$ having a convex surface on the image side, a negative lens element $L_5$ having a convex surface on the object side, and a biconvec lens element $L_6$ having an aspherical surface on the image side: the lens element $L_3$ being cemented to the lens element $L_4$ and the lens element $L_5$ being cemented to the lens element $L_6$. The third lens unit $G_3$ comprises, in order from the object side, a negative lens element $L_7$ having a convex surface on the image side, a positive lens element $L_8$ having a convex surface on the image side and a biconvex lens component $L_9$ having an aspherical surface on the object side which weakens a negative refractive power as portions of the aspherical surface are farther from an optical axis thereof toward a margin thereof: the lens element $L_7$ being cemented to the lens element $L_8$.

In the fourth embodiment, the third lens unit $G_3$ is used as the negative lens unit GN which is disposed on the most image side, and the front subunit GF of this negative lens unit is composed of a cemented lens component consisting of the lens element $L_7$ and the lens element $L_8$, whereas the rear subunit GR is composed of the lens component $L_9$. Further, the lens element $L_7$ corresponds to the negative lens component LF disposed in the front subunit GF and the lens element $L_8$ corresponds to the positive lens component LR disposed in the front subunit GF.

Each of the first embodiment, the second embodiment, and the third embodiment is a zoom lens system which consists of two lens units, or in which the lens unit $G_1$ corrsponds to the above-mentioned positive lens unit $GP_1$ and the second lens unit $G_2$ corresponds to the above-mentioned lens unit GN, whereas the third embodiment is a zoom lens system which consists of three lens units, or in which the lens units $G_1$ and $G_2$ correspond to the above-mentioned two positive lens units GP1 and GP2 respectively, whereas the lens unit $G_3$ corresponds to the above-mentioned lens unit GN. The object of the present invention can be accomplished also by the fourth embodiment.

The asphercial surfaces used in the embodiments of the present invention described above have shapes which are expressed by the formula shown below:

$$X = \frac{Y^2/r}{\sqrt{1 - P(Y/r)^2}} + EY^4 + FY^6 + GY^8 + HY^{10} + IY^{12}$$

wherein the reference symbol r represents a paraxial radius of curvature on an aspherical surface of interest, the reference symbol P designates a conical coefficient, and the reference symbols E, F, G, H and I denote aspherical surface coefficients of the fourth, sixth, eighth, tenth and twelfth orders respectively.

In addition, FIG. 1A, FIG. 2A, FIG. 3A and FIG. 4A show sectional views illustrating compositions at the wide positions of the embodiments of the present invention, FIG. 1B, FIG. 2B, FIG. 3B and FIG. 4B show sectional views illustrating compositions at the intermediate focal lengths of the embodiments of the present invention, and FIG. 1C, FIG. 2C, FIG. 3C and FIG. 4C show sectional views illustrating compositions at the tele positions of the embodiments of the present invention.

The zoom lens system according to the present invention comprises a lens unit, on the image side, which is configured so as to favorably correct chromatic aberration in this lens unit itself, thereby allowing aberrations to be varied little by zooming and having aberrations favorably corrected over the entire range from the wide postion to the tele postion thereof.

I claim:

1. A zoom lens system comprising:

a plurality of lens units;

wherein a lens unit which is disposed on an image side among said plurality of lens units has a negative refractive power, said lens unit which has the negative refractive power consists of a first subunit having a positive refractive power and a second subunit having a negative refractive power, wherein said first subunit comprises a cemented lens component consisting of a negative lens element disposed on an object side and a positive lens element disposed on said image side, wherein said second subunit has a negative lens component, wherein said lens unit disposed on the image side comprises at least one aspherical surface, and wherein said zoom lens system satisfies the following condition (1):

$$-0.6 < f_{GR}/f_{GF} < -0.17 \quad (1)$$

wherein the reference symbol $f_{GF}$ represents a focal length of said first subunit and the reference symbol $f_{GR}$ designates a focal length of said second subunit.

2. A zoom lens system according to claim 1 wherein said aspherical surface has such a shape as to weaken a negative refractive power as portions of the aspherical surface are farther from an optical axis thereof.

3. A zoom lens system according to claim 2 wherein said aspherical surface is used as an object side surface of the negative lens element disposed in said first subunit.

4. A zoom lens system according to claim 2 wherein said aspherical surface is used an object side surface of the negative lens component disposed in said second subunit.

5. A zoom lens system according to claim 2 satisfying the following condition (2):

$$0.1 < f_{GN}/f_{LF} < 0.9 \quad (2)$$

wherein the reference symbol $f_{GN}$ represents a focal length of said lens unit disposed on the image side and the reference symbol $f_{LF}$ designates a focal length of the negative lens element disposed in said first subunit.

6. A zoom lens system according to claim 5 wherein the positive lens element disposed in said front subunit satisfies the following condition (3):

$$-1.6 < r_R/I_h < -0.7 \quad (3)$$

wherein the reference symbol $r_R$ represents a radius of curvature on an image side surface of the positive lens element disposed in said first subunit and the reference symbol $I_h$ designates an image height thereon.

7. A zoom lens system according to claim 1, 2, 5 or 6 wherein a lens unit having a positive refractive power is disposed on the object side of said lens unit diposed on the image side and an airspace reserved between these two lens units is varied for zooming the lens system.

8. A zoom lens system according to claim 1, 2, 5 or 6 wherein two lens units having positive refractive powers are disposed on the object side of said lens unit disposed on the image side and airspaces reserved among the lens units adjacent to one another are varied for zooming the lnes system.

9. A zoom lens system according to claim 1, 2, 5 or 6 wherein the cemented lens component disposed in said first subunit has a meniscus shape.

10. A zoom lens system according to claim 1, 2, 5 or 6 wherein the negative lens element disposed in said first subunit is a lens element which has an aspherical surface and is made of a synthetic resin material.

11. A zoom lens system according to claim 1, wherein said second subunit consists only of said negative lens component.

12. A zoom lens system according to claim 11, wherein said negative lens component consists of a single lens.

13. A zoom lens system comprising:

a plurality of lens units;

wherein a lens unit which is disposed on an image side among said plurality of lens units has a negative refractive power, said lens unit which has the negative refractive power consists of a first subunit having a negative refractive power, wherein said first subunit comprises a cemented lens component consisting of a negative lens element and a positive lens element, wherein said second subunit consists only of a negative lens component, wherein said lens unit disposed on the image side comprises at least one aspherical surface, wherein said zoom lens system satisfies the following condition (1):

$$-0.6 < f_{GR}/f_{GF} < -0.17 \qquad (1)$$

wherein the reference symbol $f_{GF}$ represents a focal length of said first subunit and the reference symbol $f_{GR}$ designates a focal length of said second subunit, wherein said aspherical surface has such a shape as to weaken a negative refractive power as portions of the aspherical surface are farther from an optical axis thereof, and wherein said zoom lens system satisfies the following condition (2):

$$0.1 < f_{GN}/f_{LF} < 0.9 \qquad (2)$$

wherein the reference symbol $f_{GN}$ represents a focal length of said lens unit disposed on the image side and the reference symbol $f_{LF}$ designates a focal length of the negative lens element disposed in said first subunit.

14. A zoom lens system according to claim 13 wherein the positive lens element disposed in said front subunit satisfies the following condition (3):

$$-1.6 < r_R/I_h < -0.7 \qquad (3)$$

wherein the reference $r_R$ represented a radius of curvature on an image side surface of the positive lens element disposed in said first subunit and the reference $I_h$ designates an image height thereon.

15. A zoom lens system according to claim 13 or 14 wherein a lens unit having a positive refractive power is disposed on the object side of said lens unit disposed on the image side and an airspace reserved between these two lens units is varied for zooming the lens system.

16. A zoom lens system according to claim 13 or 14 wherein two lens units having positive refractive powers are disposed on the object side of said lens unit disposed on the image side and airspaces reserved among the lens units adjacent to one another are varied for zooming the lens system.

17. A zoom lens system according to claim 13 or 14 wherein the cemented lens component disposed in said first subunit has a meniscus shape.

18. A zoom lens system according to claim 13 or 14 wherein the negative lens element disposed in said first subunit is a lens element which has an aspherical surface and is made of a synthetic resin material.

19. A zoom lens system comprising:

a plurality of lens units;

wherein a lens unit which is disposed on an image side among said plurality of lens units has a negative refractive power, said lens unit which has the negative refractive power consists of a first subunit having a negative refractive power, wherein said first subunit comprises a cemented lens component consisting of a negative lens element and a positive lens element, wherein said second subunit consists only of a negative lens component, wherein said lens unit disposed on the image side comprises at least one aspherical surface, wherein said zoom lens system satisfies the following condition (1):

$$-0.6 < f_{GR}/f_{GF} < -0.17 \qquad (1)$$

wherein the reference symbol $f_{GF}$ represents a focal length of said first subunit and the reference symbol $f_{GR}$ designates a focal length of said second subunit, and wherein a lens unit having a positive refractive power is disposed on the object side of said lens unit disposed on the image side and an airspace reserved between these two lens units is varied for zooming the lens system.

20. A zoom lens system comprising:

a plurality of lens units;

wherein a lens unit which is disposed on an image side among said plurality of lens units has a negative refractive power, said lens unit which has the negative refractive power consists of a first subunit having a negative refractive power, wherein said first subunit comprises a cemented lens component consisting of a negative lens element and a positive lens element, wherein said second subunit consists only of a negative lens component, wherein said lens unit disposed on the image side comprises at least one aspherical surface, wherein said zoom lens system satisfies the following condition (1):

$$-0.6 < f_{GR}/f_{GF} < -0.17 \qquad (1)$$

wherein the reference symbol $f_{GF}$ represents a focal length of said first subunit and the reference symbol $f_{GR}$ designates a focal length of said second subunit, and wherein two lens units having positive refractive powers are disposed on the object side of said lens unit disposed on the image side and airspaces reserved among the lens units adjacent to one another are varied for zooming the lens system.

21. A zoom lens system comprising:

a plurality of lens units;

wherein a lens unit which is disposed on an image side among said plurality of lens units has a negative refractive power, said lens unit which has the negative refractive power consists of a first subunit having a negative refractive power, wherein said first subunit comprises a cemented lens component consisting of a negative lens element and a positive lens element, wherein said second subunit consists only of a negative lens component, wherein said lens unit disposed on the image side comprises at least one aspherical surface, wherein said zoom lens system satisfies the following condition (1):

$$-0.6 < f_{GR}/f_{GF} < -0.17 \tag{1}$$

wherein the reference symbol $f_{GF}$ represents a focal length of said first subunit and the reference symbol $f_{GR}$ designates a focal length of said second subunit, and wherein the cemented lens component disposed in said first subunit has a meniscus shape.

22. A zoom lens system comprising:

a plurality of lens units;

wherein a lens unit which is disposed on an image side among said plurality of lens units has a negative refractive power, said lens unit which has the negative refractive power consists of a first subunit having a negative refractive power, wherein said first subunit comprises a cemented lens component consisting of a negative lens element and a positive lens element, wherein said second subunit consists only of a negative lens component, wherein said lens unit disposed on the image side comprises at least one aspherical surface, wherein said zoom lens system satisfies the following condition (1):

$$-0.6 < f_{GR}/f_{GF} < -0.17 \tag{1}$$

wherein the reference symbol $f_{GF}$ represents a focal length of said first subunit and the reference symbol $f_{GR}$ designates a focal length of said second subunit, and wherein the negative lens element disposed in said first subunit is a lens element which has an aspherical surface and is made of a synthetic resin material.

23. A zoom lens system according to claims 19, 20, 21 or 22 wherein said aspherical surface has such a shape as to weaken a negative refractive power as portions of the aspherical surface are farther from an optical axis thereof.

* * * * *